(12) United States Patent
Lam et al.

(10) Patent No.: US 7,294,388 B2
(45) Date of Patent: *Nov. 13, 2007

(54) FRICTION MATERIAL WITH NANOPARTICLES OF FRICTION MODIFYING LAYER

(75) Inventors: Robert C. Lam, Rochester, MI (US); Yih-Fang Chen, Lisle, IL (US); Kenji Maruo, Fukuroi Shizuoka (JP)

(73) Assignee: BorgWarner Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/218,019

(22) Filed: Aug. 13, 2002

(65) Prior Publication Data

US 2004/0033341 A1 Feb. 19, 2004

(51) Int. Cl.
| | |
|---|---|
| *D06N 7/04* | (2006.01) |
| *B32B 27/12* | (2006.01) |
| *B32B 5/22* | (2006.01) |
| *B32B 9/00* | (2006.01) |
| *F16D 13/60* | (2006.01) |
| *F16D 69/00* | (2006.01) |

(52) U.S. Cl. .................. 428/143; 428/141; 428/304.4; 428/317.9; 428/378; 428/391; 192/107 M; 188/251 A; 188/251 R; 188/251 M

(58) Field of Classification Search ............... 428/141, 428/143, 391, 378, 317.9, 304.4; 188/251 A, 188/251 M, 251 R; 192/107, 107 M
See application file for complete search history.

(56) References Cited

U.S. PATENT DOCUMENTS

| | | | |
|---|---|---|---|
| 4,451,590 A | 5/1984 | Fujimaki et al. | |
| 4,524,169 A * | 6/1985 | Wolff et al. ................. | 524/263 |
| 4,915,856 A * | 4/1990 | Jamison ..................... | 508/103 |
| 5,083,650 A | 1/1992 | Seiz et al. | |
| 5,585,166 A | 12/1996 | Kearsey | |
| 5,707,905 A | 1/1998 | Lam et al. | |
| 5,753,356 A | 5/1998 | Lam et al. | |
| 5,856,244 A | 1/1999 | Lam et al. | |
| 5,858,883 A | 1/1999 | Lam et al. | |
| 5,958,507 A | 9/1999 | Lam et al. | |
| 5,998,307 A | 12/1999 | Lam et al. | |
| 6,001,750 A | 12/1999 | Lam | |
| 6,130,176 A | 10/2000 | Lam | |
| 6,194,059 B1 * | 2/2001 | Yesnik ........................ | 428/218 |
| 6,316,086 B1 * | 11/2001 | Beier et al. ............... | 428/293.4 |
| 6,352,758 B1 * | 3/2002 | Huang et al. ................ | 428/143 |
| 6,387,531 B1 * | 5/2002 | Bi et al. ...................... | 428/570 |
| 6,569,816 B2 * | 5/2003 | Oohira et al. ............... | 508/107 |
| 6,601,321 B1 * | 8/2003 | Kendall ......................... | 36/88 |

FOREIGN PATENT DOCUMENTS

| | | |
|---|---|---|
| EP | 1 039 168 A1 | 9/2000 |
| EP | 1 203 897 A1 | 5/2002 |
| WO | WO 98/09093 | 3/1998 |

OTHER PUBLICATIONS

European Search Report; Dec. 12, 2003; 02257364.6.

* cited by examiner

*Primary Examiner*—Patricia L. Nordmeyer
(74) *Attorney, Agent, or Firm*—Emch, Schaffer, Schaub & Porcello Co., L.P.A.

(57) ABSTRACT

A friction material which includes a base material, at least one type of resin material, and at least one type of nanoparticle-sized friction modifying particle is disclosed.

29 Claims, 6 Drawing Sheets

FRICTION MATERIAL WITH NANOPARTICLES OF FRICTION MODIFYING LAYER

TECHNICAL FIELD

Figure 1A:

The present invention relates to a fiction material having a first or lower layer comprising a base material saturated at least one type of curable resin and a second or top layer comprising at least one type of friction modifying particle which comprises nanoparticles of friction modifying materials. The friction material of the present invention has high coefficient of friction characteristics, very good anti-shudder characteristics, (i.e., excellent du/dv slope characteristics) and extremely high heat resistance. The friction material also has improved strength, porosity, wear resistance and noise resistance.

BACKGROUND ART

New and advanced continuous torque transmission systems, having continuous slip torque converters and shifting clutch systems are being developed by the automotive industry. These new systems often involve high energy requirements. Therefore, the friction materials technology must be also developed to meet the increasing energy requirements of these advanced systems.

In particular, a new high performance, durable friction material is needed. The new friction material must be able to withstand high speeds wherein surface speeds are up to about 65 m/seconds. Also, the friction material must be able to withstand high facing lining pressures up to about 1500 psi. It is also important that the friction material be useful under limited lubrication conditions.

The friction material must be durable and have high heat resistance in order to be useful in the advanced systems. Not only must the friction material remain stable at high temperatures, it must also be able to rapidly dissipate the high heat that is being generated during operating conditions.

The high speeds generated during engagement and disengagement of the new systems mean that a friction material must be able to maintain a relatively constant friction throughout the engagement. It is important that the frictional engagement be relatively constant over a wide range of speeds and temperatures in order to minimize "shuddering" of materials during braking or the transmission system during power shift from one gear to another. It is also important that the friction material have a desired torque curve shape so that during frictional engagement the friction material is noise or "squawk" free.

In particular, transmission and torque-on-demand systems incorporate slipping clutches mainly for the fuel efficiency and driving comfort. The role of the slip clutch within these systems varies from vehicle launching devices, such as wet start clutches, to that of a torque converter clutches. According to the operating conditions, the slip clutch can be differentiated into three principle classes: (1) Low Pressure and High Slip Speed Clutch, such as wet start clutch; (2) High Pressure and Low Slip Speed Clutch, such as Converter Clutch; and (3) Extreme Low Pressure and Low Slip Speed Clutch, such as neutral to idle clutch.

The principal performance concerns for all applications of the slip clutch are the prevention of shudder and the energy management of the friction interface. The occurrence of shudder can be attributed to many factors including the friction characteristics of the friction material, the mating surface's hardness and roughness, oil film retention, lubricant chemistry and interactions, clutch operating conditions, driveline assembly and hardware alignment, and driveline contamination. The friction interface energy management is primarily concerned with controlling interface temperature and is affected by the pump capacity, oil flow path and control strategy. The friction material surface design also contributes to the efficiency of interface energy management.

Previously, asbestos fibers were included in the friction material for temperature stability. Due to health and environmental problems, asbestos is no longer being used. More recent friction materials have attempted to overcome the absence of the asbestos in the friction material by modifying impregnating paper or fiber materials with phenolic or phenolic-modified resins. These friction materials, however, do not rapidly dissipate the high heat generated, and do not have the necessary heat resistance and satisfactory high coefficient of friction performance now needed for use in the high speed systems currently being developed.

The Seiz U.S. Pat. No. 5,083,650 reference involves a multi-step impregnating and curing process; i.e., a paper impregnated with a coating composition, carbon particles are placed on the paper, the coating composition in the paper is partially cured, a second coating composition is applied to the partially cured paper, and finally, both coating compositions are cured.

Various paper based fibrous materials have been developed that are co-owned by the assignee herein, BorgWarner Inc., for use in friction materials. These references are fully incorporated herein by reference.

In particular, Lam et al., U.S. Pat. No. 5,998,307 relates to a friction material having a primary fibrous base material impregnated with a curable resin where the porous primary layer comprises at least one fibrous material and a secondary layer comprises carbon particles covering at least about 3 to about 90% of the surface of the primary layer.

The Lam et al., U.S. Pat. No. 5,858,883 relates to a base material having a primary layer of less fibrillated aramid fibers, synthetic graphite, and a filler, and a secondary layer comprising carbon particles on the surface of the primary layer.

The Lam et al., U.S. Pat. No. 5,856,224 relates to a friction material comprising a base impregnated with a curable resin. The primary layer comprises less fibrillated aramid fibers, synthetic graphite and filler; the secondary layer comprises carbon particles and a retention aid.

The Lam et al. U.S. Pat. No. 5,958,507 relates to a process for producing a friction material where about 3 to about 90% of at least one surface of the fibrous material which comprises less fibrillated aramid fibers is coated with carbon particles.

The Lam, U.S. Pat. No. 6,001,750 relates to a friction material comprising a fibrous base material impregnated with a curable resin. The porous primarily layer comprises less fibrillated aramid fibers, carbon particles, carbon fibers, filler material, phenolic novoloid fibers, and optionally, cotton fibers. The secondary layer comprises carbon particles which cover the surface at about 3 to about 90% of the surface.

Yet another commonly owned patent application Ser. No. 09/707,274 relates to a paper type friction material having a porous primary fibrous base layer with friction modifying particles covering about 3 to about 90% of the surface area of the primary layer.

In addition, various paper type fibrous base materials are described in commonly owned BorgWarner Inc. Lam et al., U.S. Pat. Nos. 5,753,356 and 5,707,905 which describe base materials comprising less fibrillated aramid fibers, synthetic graphite and filler, which references are also fully incorporated herein by reference.

Another commonly owned patent, the Lam, U.S. Pat. No. 6,130,176, relates to non-metallic paper type fibrous base materials comprising less fibrillated aramid fibers, carbon fibers, carbon particles and filler.

For all types of friction materials, in order to be useful in "Wet" applications, the friction material must have a wide variety of acceptable characteristics. The friction material must have good anti-shudder characteristics; have high heat resistance and be able to dissipate heat quickly; and, have long lasting, stable and consistent frictional performance. If any of these characteristics are not met, optimum performance of the friction material is not achieved.

It is also important that a suitable impregnating resin be used in the friction material in order to form a high energy application friction material. The friction material must have good shear strength during use when the friction material is infused with brake fluid or transmission oil during use.

Accordingly, it is an object of the present invention to provide an improved friction material with reliable and improved properties compared to those of the prior art.

A further object of this invention is to provide friction materials with improved "anti-shudder", "hot spot" resistance, high heat resistance, high friction stability and durability, and strength.

As a result of extensive research in view of the need for a better saturant for a friction material, a friction material with improved characteristics has been developed by the invention.

IN THE DRAWINGS

FIG. 1a is a schematic diagram showing a prior art friction material having a fibrous base and friction modifying particle.

Figures 1B, 1C, 1D:
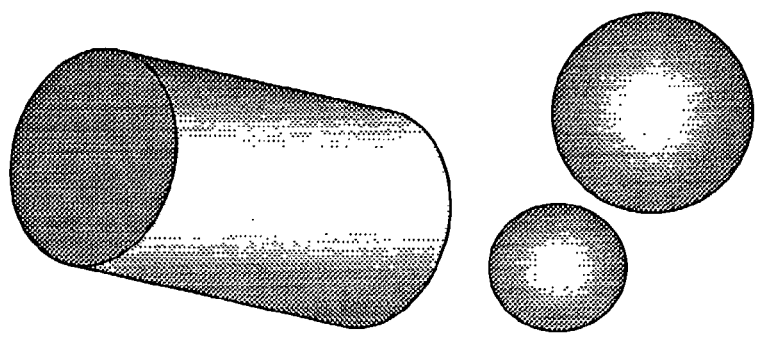

FIGS. 1b-1d are schematic diagrams showing relative sizes of particles: FIG. 1b—typical fiber diameter of 10-15 micrometers; FIG. 1c—typical average size of diatom particle of 10-20 micrometers; FIG. 1d nanoparticle size of 0.01 micrometers.

Figure 2A:
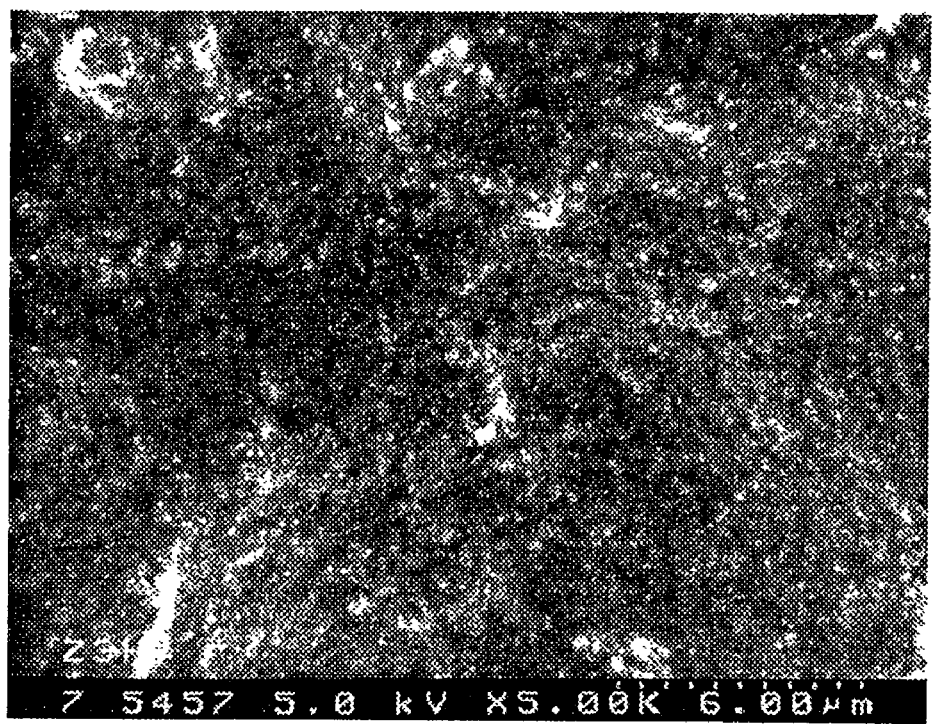
Figure 2B:
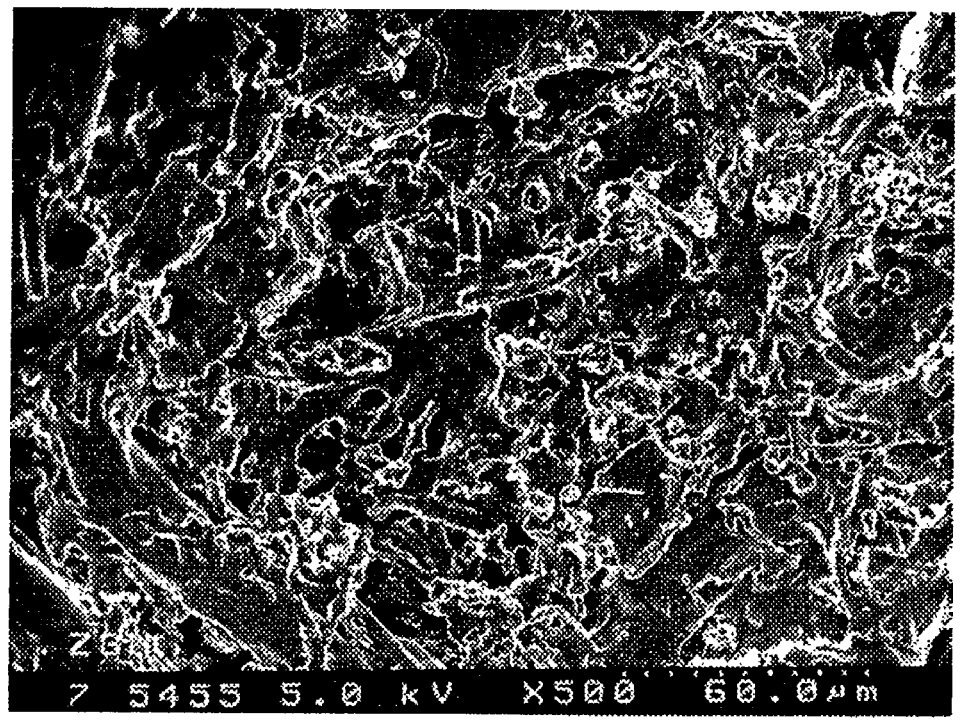

FIG. 2a is a SEM image of a nanoparticle friction material of the present invention at 5000 magnification; FIG. 2b is a SEM image of a nanoparticle friction material of the present invention at 500 magnification.

Figure 3A:
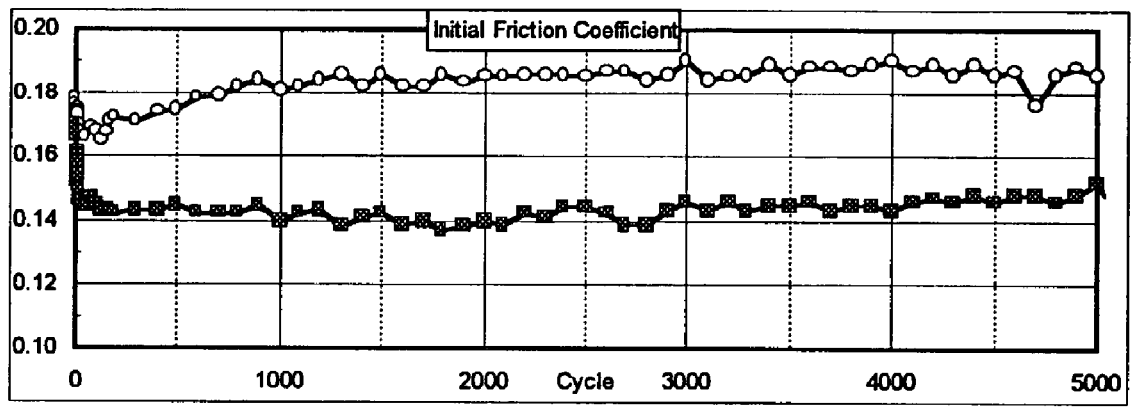
Figure 3B:
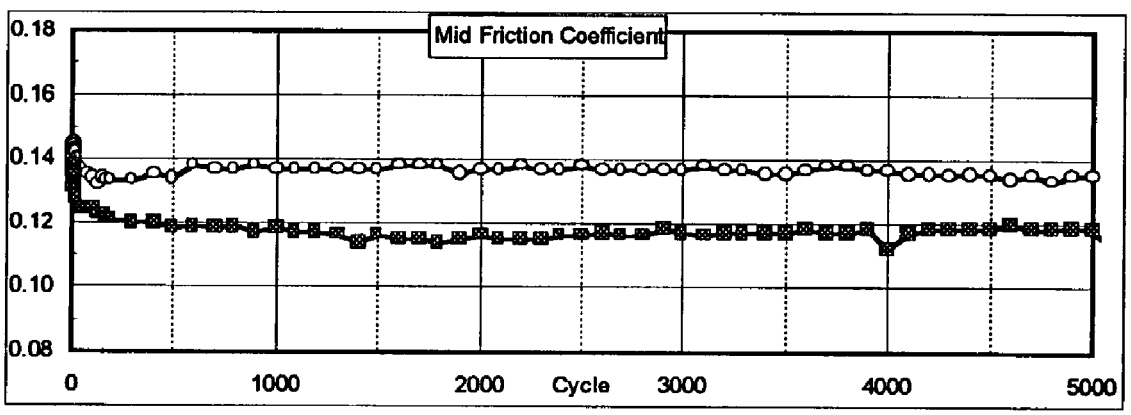
Figure 3C:
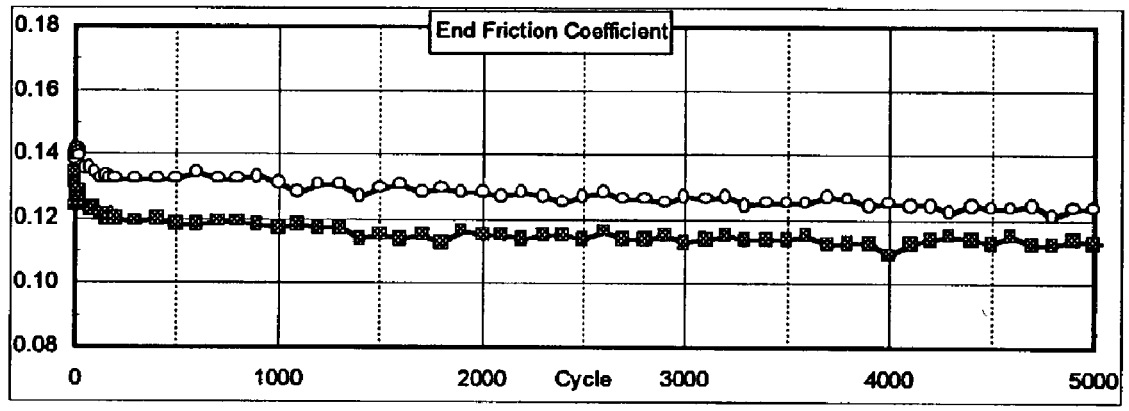
Figure 3D:
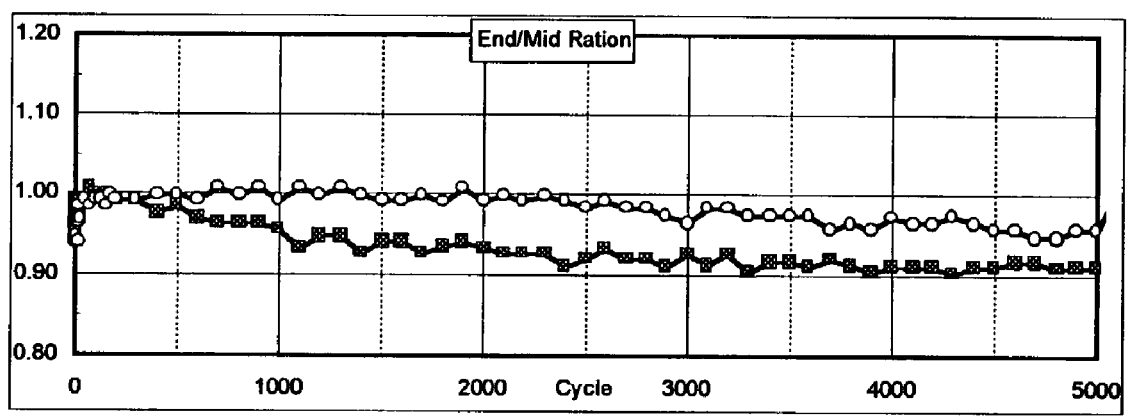

FIGS. 3a-3d are a series of graphs showing wet start clutch bench evaluations at cycles 10, 50, 100, 500, 1000, 2000, 3000, and 4000 for the friction material of the present invention (open circle line: Example 1 (showing one optimized concentration of nanoparticles on surface) and closed square shape line: comparative friction material): FIG. 3a.— shows the initial friction coefficient; FIG. 3b—shows the mid friction coefficient; FIG. 3c—shows the end friction coefficient; FIG. 3d—end/mid ratio.

Figure 4:
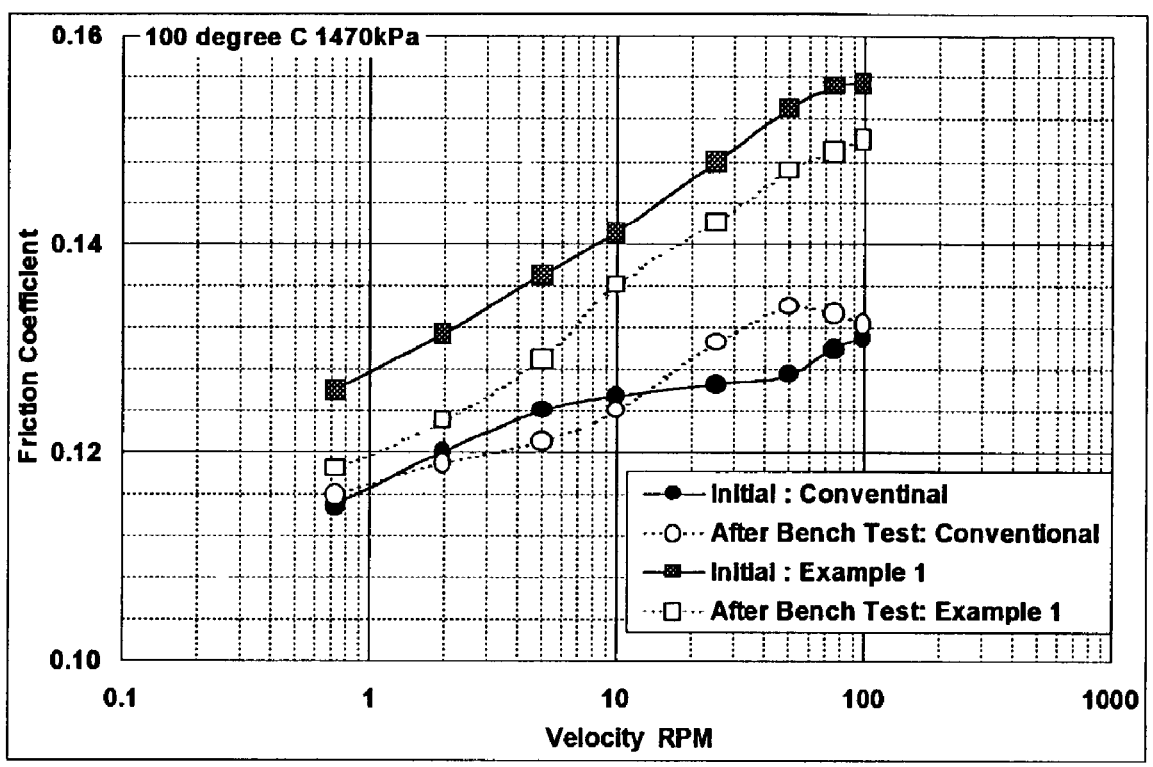
Figure 5:
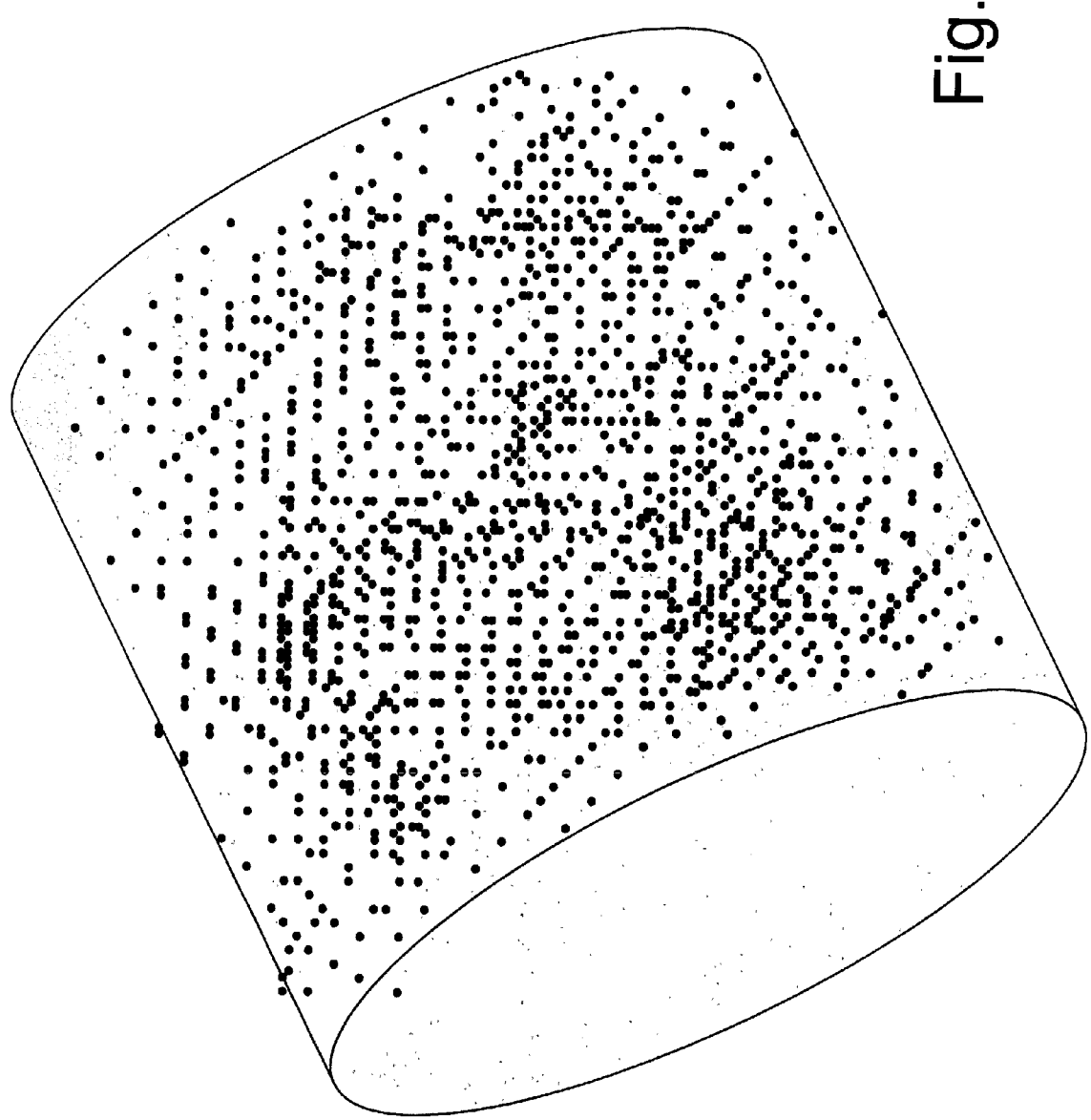

FIG. 4 is a graph showing S31 Test Results comparing the friction coefficient versus velocity (rpm) for:
 initial coefficient—comparative material (closed circle);
 initial coefficient—Example 1 of the present invention (closed square);
 after bench test—comparative material (open circle); and
 after bench test—Example 1 of the present invention (open square).
FIG.5 is a transmission band made of the oil lubricated friction material."

SUMMARY OF THE INVENTION

A friction material comprises a first layer comprising a base material and at least one type of resin material, and a second layer comprising at least one type of nanoparticle-sized friction modifying particle on a top surface of the base material. The friction material can have a layer of the nanoparticle-sized friction modifying particles with a thickness of about 10 to about 250 µm. The nanoparticle-sized friction modifying particles have an average diameter size from about 10 nm to about 150 nm. In certain embodiments, the nanoparticle layer covers about 3 to about 99%, by area, of the base material, an in other embodiments, the nanoparticles cover about 3 to about 20%, by area, of the base material. Further, in certain embodiments, the nanoparticles at least partially cover individual fibers and/or filler of the base material.

In certain preferred embodiments, the friction modifying particles comprise silica nanoparticles.

In certain other embodiments, the friction modifying particles can further comprise silica particles and at least one other nanoparticle sized friction modifying particle.

DETAILED DESCRIPTION OF INVENTION

In order to achieve the requirements discussed above, many friction materials were evaluated for friction and heat resistant characteristics under conditions similar to those encountered during operation. Commercially available friction materials were investigated and proved not to be suitable for use in high-energy applications.

According to the present invention, a friction material has a uniform dispersion of the curable resin throughout a base material and a substantially uniform layer of the nanoparticles of friction modifying materials on a main surface of the base material.

According to the present invention a layer of nanoparticles is deposited on the main surface of the fibrous friction base material. The base fibrous layer can be completely covered with nanoparticles, or, alternatively, partially covered with nanoparticles. In either embodiment, the nanoparticles penetrate into the interior structure and adhere on the fiber and/or filler ingredients of the base material.

While not wishing to be bound by theory, it is believed that the nanoparticles, when adhered to the fibers of the base material, provide additional mechanical strength and an increase in the friction characteristics to the friction material. The nanoparticles adhere to the surface of the fibers and/or fillers present in the base material due to their extremely small size and due to the relatively large surface area provided by the fibers/filler themselves in comparison to the nanoparticles. The extremely small size of the nanoparticles, in comparison to the fibers/fillers in the base material, allows the nanoparticles to be substantially evenly distributed over the surface of the ingredients (i.e., for example, the fibers and/or fillers) of the base material.

One advantage of the deposit of such nanoparticles onto the surface is that friction performance is enhanced (e.g. higher coefficients of friction; better mu-v slope, and the like).

In certain embodiments the nanoparticles diameter size ranges from about 10 nm to 150 nm. Also, in certain embodiments, the nanoparticles form clusters of nanoparticles. According to one aspect of the present invention, the top layer of the nanoparticle friction modifying particles forms a dense, or substantially nonporous layer that has a lower permeability in both the radial and normal directions than the base layer. The lower permeability of the top layer of the nanoparticle friction modifying particles causes the friction material to retain a desired amount of fluid on the top surface.

According to another aspect of the present invention, the top layer of the nanoparticle friction modifying particles forms an open, or substantially porous, layer that has a higher permeability than the base material layer. The higher permeability of the top layer of the nanoparticle friction modifying particles still allows the friction material to retain a desired amount of fluid on the top surface of the friction material while providing the friction material with desired characteristics.

Thus, yet another aspect of the present invention relates to a friction material having the novel microstructured surfaces (i.e., the "dense" or "porous" nanoparticle surfaces), as described above. These nanoparticle, or microstructured-surface, friction materials have a desired high coefficient of friction, more robust anti-shudder characteristics, and extremely high heat resistance.

In certain embodiments, the present invention relates to a friction material having a porous or lofty and open base material. The friction material has a desired low density and has a fiber architecture which allows a resin material to soak into the friction material. The friction material has extremely good heat resistance and coefficient of friction characteristics which allows the friction material to respond well under thermal and mechanical stresses.

In another aspect, the present invention relates to a "macro porous" fibrous base material (such as, for example a woven base material) having a surface which is partially covered by the nanoparticle-sized friction modifying materials. The large pores in the porous base material allow the nanoparticle-sized friction modifying materials to settle into the voids or interstices in the porous base material. In the macro-porous friction material of the present invention, the large pores allow contaminants in the fluid to pass through readily the friction material. As is known to those skilled in the art, lubrications deteriorate over time and debris is generated. The friction material of the present invention keeps the friction behavior of the friction material constant throughout the useful life of friction material.

In one aspect of the present invention, the base material average voids volume from about 40% to about 80%. In certain embodiments, the base material has an average pore/void/interstice diameter of about 2 to about 10 µm, and having an average diameter of about 5 to about 7 µm.

Further, in certain embodiments, the friction modifying particles comprise nanoparticles of silica, in other embodiments, the nanoparticles can combine a mixture of other friction modifying particles.

In still other embodiments, the friction modifying particles can also include other friction modifying particles such as metal oxides, nitrides, carbides, and in further embodiments, a mixture of carbon particles and silica particles. It is within the contemplated scope of the present invention that these embodiments can include, for example, silica oxides, iron oxides, aluminum oxides, titanium oxides and the like; silica nitrides, iron nitrides, aluminum nitrides, titanium nitrides and the like; and, silica carbides, iron carbides, aluminum carbides, titanium carbides and the like.

Various base materials are useful in the friction material of the present invention, including, for example, non-asbestos base materials comprising, for example, fabric materials, woven and/or nonwoven materials. Suitable base materials include, for example, fibers and fillers. The fibers can be organic fibers, inorganic fibers and carbon fibers. The organic fibers can be aramid fibers, such as fibrillated and/or less fibrillated aramid fibers, acrylic fibers, polyester fibers, nylon fibers, polyamide fibers, cotton/cellulose fibers and the like. The fillers can be, for example, silica, diatomaceous earth, graphite, alumina, cashew dust and the like.

In certain embodiments, the friction material comprises a base material which has a plurality of voids or interstices therein. The size of the voids in the base material can range from about 0.5 µm to about 20 µm.

In certain embodiments, the base material can be any suitable material such as a fibrous base material. The friction material further comprises a resin material which at least partially fills the voids in the base material. The resin material is substantially uniformly dispersed throughout the thickness of the base material.

In certain embodiments, the base material comprises a fibrous base material where less fibrillated fibers and carbon fibers are used in the fibrous base material to provide a desirable pore structure to the friction material. The fiber geometry not only provides increased thermal resistance, but also provides delamination resistance and squeal or noise resistance. Also, in certain embodiments, the presence of the carbon fibers and carbon particles aids in the fibrous base material in increasing the thermal resistance, maintaining a steady coefficient of friction and increasing the squeal resistance. A relatively low amount of cotton fibers in the fibrous base material can be included to improve the friction material's clutch "break-in" characteristics.

In certain embodiments, the use of less fibrillated aramid fibers and carbon fibers in a fibrous base material improves the friction material's ability to withstand high temperatures. Less fibrillated aramid fibers generally have few fibrils attached to a core fiber. The use of the less fibrillated aramid fibers provides a friction material having a more porous structure; i.e., there are more and larger pores than if a typical fibrillated aramid fiber is used. The porous structure is generally defined by the pore size and liquid permeability.

In certain embodiments, the fibrous base material defines pores ranging in mean average size from about 2.0 to about 25 microns in diameter. In certain embodiments, the mean pore size ranges from about 2.5 to about 8 microns in diameter and the friction material had readily available air voids of at least about 50% and, in certain embodiments, at least about 60% or higher.

Also, in certain embodiments, it is desired that the aramid fibers have a length ranging from about 0.5 to about 10 mm and a Canadian Standard Freeness (CSF) of greater than about 300. In certain embodiments, it is also desired to use less fibrillated aramid fibers which have a CSF of about 450 to about 550 preferably about 530 and greater; and, in other certain embodiments, about 580-650 and above and preferably about 650 and above. In contrast, more fibrillated fibers, such as aramid pulp, have a freeness of about 285-290.

The "Canadian Standard Freeness" (T227 om-85) means that the degree of fibrillation of fibers can be described as the measurement of freeness of the fibers. The CSF test is an empirical procedure which gives an arbitrary measure of the rate at which a suspension of three grams of fibers in one liter of water may be drained. Therefore, the less fibrillated aramid fibers have higher freeness or higher rate of drainage of fluid from the friction material than other aramid fibers or pulp. Friction materials comprising the aramid fibers having a CSF ranging from about 430-650 (and in certain embodiments preferably about 580-640, or preferably about 620-640), provide superior friction performance and have better material properties than friction materials containing conventionally more fibrillated aramid fibers. The longer fiber length, together with the high Canadian freeness, provides a friction material with high strength, high porosity and good wear resistance. The less fibrillated aramid fibers (CSF about 530-about 650) have especially good long-term durability and stable coefficients of friction.

Various fillers are also useful in the primary layer of the fibrous base material of the present invention. Other embodiments can have friction modifying particles such as resin powders such as phenolic resins, silicone resins epoxy resins and mixtures thereof. Still other embodiments can include partial and/or fully carbonized carbon powders and/or particles admixtures thereof; and mixtures of such friction modifying particles. In certain embodiments, silica particles such as diatomaceous earth, Celite®, Celatom®, and/or silicon dioxide are especially useful. In particular, silica fillers, such as diatomaceous earth, are useful. However, it is contemplated that other types of fillers are suitable for use in the present invention and that the choice filler depends on the particular requirements of the friction material.

In certain embodiments, cotton fiber is added to the fibrous base material of the present invention to give the fibrous material higher coefficients of friction. In certain embodiments, about 5 to about 20%, and, in certain embodiments, about 10% cotton can also be added to the fibrous base material.

One example of a formulation for the primary layer of a fibrous base material as described in the above incorporated by reference U.S. Pat. No. 6,130,176, which comprises about 10 to about 50%, by weight, of a less fibrillated aramid fiber; about 10 to about 35%, by weight, of activated carbon particles; about 5 to about 20%, by weight, cotton fibers, about 2 to about 15%, by weight, carbon fibers; and, about 10 to about 35%, by weight of a filler material.

In certain other embodiments, one particular formulation has found to be useful comprises about 35 to about 45%, by weight, less fibrillated aramid fibers; about 10 to about 20%, by weight, activated carbon particles; about 5 to about 15% cotton fibers; about 2 to about 20%, by weight, carbon fibers; and, about 25 to about 35%, by weight, filler.

In still other embodiments, the base material comprises from about 15 to about 25% cotton, about 40 to about 50% aramid fibers, about 10 to about 20% carbon fibers, about 5 to about 15% carbon particles, about 5 to about 15% celite, and, optionally about 1 to about 3% latex add-on.

When the base material has a high mean flow pore diameter and permeability, the friction material is more likely to run cooler or with less heat generated in a transmission due to better automatic transmission fluid flow throughout the porous structure of the friction material. During operation of a transmission system, the fluid tends, over time, to breakdown and form "oil deposits", especially at high temperatures. These "oil deposits" decrease the pore openings in the base material. Therefore, when the friction material initially starts with larger pores in the base material, there are more open pores remaining during the useful life of the friction material. In addition, in embodiments at least partially impregnated with a silicone resin, the silicone resin, due its elastic characteristics, allows the fibers in the friction material to have an even more open structure.

Thus, the friction material further comprises a top, or second, layer of nanoparticles of friction modifying particles on a first, or top, surface of the base material. The presence of the nanoparticles of friction modifying materials as a top layer on the base material provides the friction material with many advantageous properties, including good oil retention properties.

The nanoparticles of friction modifying particles on the top surface of the base material provides an improved three-dimensional structure to the resulting friction material.

During use of the friction material of the present invention, the layer of oil or fluid on the top friction modifying nanoparticle layer keeps the oil film on the surface, thus making it more difficult for the oil or fluid to initially penetrate into the friction material. The top friction modifying nanoparticle layer material holds the fluid lubricant on the surface and increases the oil retaining capacity of the friction material. The friction material of the present invention thus allows an oil film to remain on its surface. This also provides good coefficient of friction characteristics and good slip durability characteristics.

In certain embodiments, the average area of coverage of friction modifying particles forming the top layer is in the range of about 3 to about 100% of the surface area. In certain other embodiments, the average area of coverage ranges from about 97 to about 99%. The friction modifying particles substantially remain on the surface the individual ingredients (i.e., for example, the fibers and/or fillers) of the base material at a preferred average thickness of about 10 to about 200 μm. In certain embodiments, the top layer has a preferred average thickness of about 60 to about 100 microns.

In various different embodiments, the coverage of the nanoparticles is somewhat scattered such that the area of coverage ranges from about 3 to about 20%. In certain embodiments, the nanoparticles cover the individual fibers and/or fillers that comprise the base material. The uniformity of the deposited layer of the friction modifying particles on the surface of the base material is achieved by using a size of the friction modifying particles that can range from about 10 to about 150 nm in diameter as the primary particle size, and preferably about 10 to about 50 nm. In certain embodiments, the particles have an average nanoparticle diameter of about 15 nm to about 30 nm as the primary nanoparticle size.

FIG. 1a is a schematic diagram showing a prior art friction material 10 having a fibrous base material 12 and diatom friction modifying particles 14. The FIGS. 1b, 1c and 1d are schematic illustrations showing a comparison between the sizes of the fibers (FIG. 1b), the conventional silica particles (FIG. 1c), and the nanoparticles used in the present invention (FIG. 1d). FIG. 5 is a schematic illustration of a fiber having nanoparticles on the surface of the fiber.

In certain embodiments, it has been discovered that when the friction modifying particle size is extremely small, a desired optimum three-dimensional structure achieved and, consequently, the heat dissipation and antishudder characteristics are optimized.

In certain embodiments, it is believed that the nanoparticles of friction modifying materials form clusters, or aggregates, of nanoparticles on the individual fibers and the fillers that form an outer surface of the base layer. In certain embodiments, the clusters have an average diameter of less than about 30 to 100 nm.

The coverage of friction modifying particles on the base material is sufficiently thick on the individual fibers and/or fillers of the base material such that the layer of friction modifying particles provides an advantageous a three-dimensional structure comprised of individual particles (and, in certain embodiments, clusters) of nanoparticles. The top layer of nanoparticles forms a three-dimensional structure on the base material which aids in holding the fluid on the top surface of the friction material.

Various types of nanoparticles of friction modifying particles are useful in the friction material. In one embodiment, useful friction modifying particles include nanoparticles of silica particles. The silica nanoparticles are organic materials which bond strongly to the base material. The silica nanoparticles provide high coefficients of friction to the friction material. The silica nanoparticles also provide the base material with a smooth friction surface and provides a good "shift feel" and friction characteristics to the friction material such that any "shudder" is minimized.

In certain embodiments, the nanoparticles of friction modifying materials comprising the top layer of the friction material in the friction of the present invention can have an irregular shape. The irregular shaped friction modifying particles act to hold a desired quantity of lubricant at the surface of the base material due to the capillary action of many invaginations on the surface of the irregularly shaped friction modifying particle.

The friction material can be impregnated using different resin systems. In certain embodiments, it is useful to use a phenolic resin or a modified phenolic-based resin, a silicone or modified silicone-based resin, an epoxy or epoxy modified-based resin, and combinations of the above.

In certain other embodiments, a silicone resin is blended or mixed with a phenolic resin in compatible solvents is useful.

The resin mixture used in making the friction material of the present invention comprises at least one type of resin and at least one type of the nanoparticle-sized friction modifying particles. The mixture of the resin and friction modifying material forms a matrix throughout the base material such that the resin material is substantially uniformly dispersed throughout the base material while a substantial amount of the nanoparticle-sized friction modifying particles forms a top layer on a top surface of the base material. The resin material in the saturant has a desired viscosity which allows the resin material to flow through the base material during a saturation process. There is a greater percentage of nanoparticle-sized friction modifying particles that form a layer on a top surface of the impregnated or saturated base material.

Various resins are useful in the present invention. In certain embodiments, the resin can comprise phenolic or phenolic based resins, preferably so that the saturant material comprises about 45 to about 65 parts, by weight, per 100 parts, by weight, of the friction material. After the resin mixture has been applied to the base material and the base material has been impregnated with the resin mixture, the impregnated base material is heated to a desired temperature for a predetermined length of time to form a friction material. In certain embodiments, the heating cures the phenolic resin present in the saturant at a temperature of about 300° F. When other resins are present in the saturant, such as a silicone resin, the heating cures the silicone resin at a temperature of about 400° F. Thereafter, the cured friction material is adhered to a desired substrate by suitable means.

Various useful resins include phenolic resins and phenolic-based resins. It is to be understood that various phenolic-based resins which include in the resin blend other modifying ingredients, such as epoxy, butadiene, silicone, tung oil, benzene, cashew nut oil and the like, are contemplated as being useful with the present invention. In the phenolic-modified resins, the phenolic resin is generally present at about 50% or greater by weight (excluding any solvents present) of the resin blend. However, it has been found that friction materials, in certain embodiments, can be improved when the mixture includes resin blend containing about 5 to about 80%, by weight, and for certain purposes, about 15 to about 55%, and in certain embodiments about 15 to about 25%, by weight, of silicone resin based on the weight of the silicone-phenolic mixture (excluding solvents and other processing acids).

Examples of useful phenolic and phenolic-silicone resins useful in the present invention are fully disclosed in the above-referenced BorgWarner U.S. patents which are fully incorporated herein, by reference. Silicone resins useful in the present invention include, for example, thermal curing silicone sealants and silicone rubbers. Various silicone resins are useful with the present invention. One resin, in particular, comprises xylene and acetylacetone (2,4-pentanedione). The silicone resin has a boiling point of about 362° F. (183° C.), vapor pressure at 68° F. mm, Hg: 21, vapor density (air=1) of 4.8, negligible solubility in water, specific gravity of about 1.09, percent volatile, by weight, 5% evaporation rate (ether=1), less than 0.1, flash point about 149° F. (65° C.) using the Pensky-Martens method. It is to be understood that other silicone resins can be utilized with the present invention. Other useful resin blends include, for example, a suitable phenolic resin comprises (% by wt.): about 55 to about 60% phenolic resin; about 20 to about 25% ethyl alcohol; about 10 to about 14% phenol; about 3 to about 4% methyl alcohol; about 0.3 to about 0.8% formaldehyde; and, about 10 to about 20% water. Another suitable phenolic-based resin comprises (% by wt.): about 50 to about 55% phenol/formaldehyde resin; about 0.5% formaldehyde; about 11% phenol; about 30 to about 35% isopropanol; and, about 1 to about 5% water.

It has also been found that another useful resin is an epoxy modified phenolic resin which contains about 5 to about 25 percent, by weight, and preferably about 10 to about 15 percent, by weight, of an epoxy compound with the remainder (excluding solvents and other processing aids) phenolic resin. The epoxy-phenolic resin compound provides, in certain embodiments, higher heat resistance to the friction material than the phenolic resin alone.

In certain embodiments, it is preferred that resin mixture comprises desired amounts of the resin and the friction modifying particles such that the target pick up of resin by the base material ranges from about 25 to about 70%, in other embodiments, from about 40 to about 65%, and, in certain embodiments, about 60 to at least 65%, by weight, total silicone-phenolic resin. After the base material is saturated with the resin, the base material is cured for a period of time (in certain embodiments for about ½ hour) at temperatures ranging between 300-400° C. to cure the resin binder and form the friction material. The final thickness of the friction material depends on the initial thickness of the base material.

It further contemplated that other ingredients and processing aids known to be useful in both preparing resin blends and in preparing base materials can be included, and are within the contemplated scope of the present invention.

In certain embodiments, the resin mixture can comprise both the silicone resin and the phenolic resin which are present in solvents which are compatible to each other. These resins are mixed together (in preferred embodiments) to form a homogeneous blend and then used to saturate the base material. In certain embodiments, there is not the same effect if the base material is impregnated with a phenolic resin and then a silicone resin is added thereafter or vice versa. There is also a difference between a mixture of a silicone-phenolic resin solution, and emulsions of silicone resin powder and/or phenolic resin powder. When silicone resins and phenolic resins are in solution they are not cured at all. In contrast, the powder particles of silicone resins and phenolic resins are partially cured. The partial cure of the silicone resins and the phenolic resins inhibits a good saturation of the base material.

In certain embodiments of the present invention, the base material is impregnated with a blend of a silicone resin in a solvent which is compatible with the phenolic resin and its solvent. In one embodiment, isopropanol has been found to be an especially suitable solvent. It is to be understood, however, that various other suitable solvents, such as ethanol, methylethyl ketone, butanol, isopropanol, toluene and the like, can be utilized in the practice of this invention. The presence of a silicone resin, when blended with a phenolic resin and used to saturate the base material, causes the resulting friction materials to be more elastic than base materials impregnated only with a phenolic resin. When pressures are applied to the silicone-phenolic resin blended impregnated friction material of the present invention, there is a more even distribution of pressure, which, in turn, reduces the likelihood of uneven lining, wear. After the silicone resin and phenolic resin are mixed together with the friction modifying particles, the mixture is used to impregnate the base material.

The friction material of the present invention includes a layer of nanoparticle-sized friction modifying particles on a top surface of a base material provides a friction material with good anti-shudder characteristics, high resistance, high coefficient of friction, high durability, good wear resistance and improved break-in characteristics.

FIG. 2a is a SEM image of a nanoparticle friction material of the present invention at 5000 magnification; FIG. 2b is a SEM image of a nanoparticle friction material of the present invention at 500 magnification.

FIGS. 3a-3d are a series of graphs showing wet start clutch bench evaluations at cycles 10, 50, 100, 500, 1000, 2000, 3000, and 4000 for the friction material of the present invention (open circle line: Example 1 (showing one optimized concentration of nanoparticles on surface) and square shape line: comparative friction material): FIG. 3a.—initial friction coefficient; FIG. 3b—mid friction coefficient; FIG. 3c—end friction coefficient; FIG. 3d—end/mid ratio.

The layer of nanoparticle-sized friction modifying materials used in the friction material of the present invention provides the friction material with good anti-shudder characteristics. In the embodiment shown, the high temperature synthetic fibers and porosity of the base material provides improved heat resistance.

The present invention, shown in the SEM in FIGS. 2a-b, is a friction material of the present invention which shows nanoparticle-sized friction modifying particles on and impregnated in the base material.

The following examples provide further evidence that the gradient of friction modifying particles within the friction material of the present invention provides an improvement over conventional friction materials. The friction materials have desirable coefficient of friction, heat resistance and durability characteristics. Various preferred embodiments of the invention are described in the following examples, which however, are not intended to limit the scope of the invention.

EXAMPLE I

A wet start clutch evaluation was conducted (4000 cycles, 950 kPa, 2100 rpm). for Ex 1 (open circle) and comparative example (square shape line): FIG. 3a.—initial friction coefficient; FIG. 3b—mid friction coefficient; FIG. 3c—end friction coefficient; FIG. 3d—end/mid ratio.

The difference in curve shapes between the open circle shape line (present invention) and square shape line (prior art material) clearly shows the higher coefficient and shows that the μ-v slope is positive. Example II FIG. 4 is a graph showing S31 Test Results comparing the friction coefficient versus velocity (rpm) for: initial coefficient—comparative material (closed circle); initial coefficient—Example 1 of the present invention (closed square); after bench test—comparative material (open circle); and, after bench test—Example 1 of the present invention (open square).

The slope versus slipping speed for the grooved material shows that the Ex. 1 has a longer life. The slope (u-speed) of $-1 \times 10^{-5}$ is acceptable in the industry. Any product below level that does not have the desired coefficient of friction characteristics. The Ex. 1 material allows the oil flow to be within the desired conditions and allows for good dissipation of heat.

Example IIII certain embodiments, the deposit of the nanoparticle-sized friction modifying particle creates a dense surface layer which reduces permeability of the top layer. In certain embodiments, the friction material of the present invention has a permeability that is lower in both the radial direction (i.e., direction parallel to a plane defined by the top, or friction modifying particle layer and in the normal direction (i.e., a direction perpendicular to the plane defined by the top layer) than the radial and normal permeabilities of the first, or base material layer. The lower permeability of the top friction modifying particle layer holds the fluid or lubricant at the surface of the friction material.

In embodiments where the nanoparticles of friction modifying particles comprise silica, the silica particles have micropores which aid in holding the lubricant at the surface due to the capillary action of the lubricant in the micropores. In particular, various types of celite, such as diatomaceous earth, have irregular shapes and rough or invaginated surfaces which further aid in holding the lubricant at the surface. Thus, the ratio of top friction modifying particle layer radial permeability to base layer radial permeability is less than 1 and the ratio of top, friction modifying particle layer normal permeability to base layer normal permeability is less than 1.

INDUSTRIAL APPLICABILITY

The present invention is useful as a high energy friction material for use with clutch plates, transmission bands, brake shoes, synchronizer rings, friction disks or system plates.

The above descriptions of the preferred and alternative embodiments of the present invention are intended to be illustrative and are not intended to be limiting upon the scope and content of the following claims.

We claim:

1. An oil lubricated friction material for use in a clutch or brake comprising a first layer comprising a fibrous base material and at least one resin material, and a second layer comprising nanoparticle-sized friction modifying particles on a top surface of the base material, the second layer of the nanoparticle-sized friction modifying particles having a thickness of about 10 nm to about 250 μm, wherein the nanoparticle-sized friction modifying particles have an average diameter size from 10 nm to 150 nm, and wherein the nanoparticle layer covers 3 to 99%, by area, of the base material.

2. The friction material of claim 1, wherein the nanoparticle-sized friction modifying particles cover 3 to 20%, by area, of the base material.

3. The friction material of claim 1, wherein the nanoparticle-sized friction modifying particles at least partially cover individual fibers and/or filler comprising the base material.

4. The friction material of claim 1, wherein the nanoparticle-sized friction modifying particles comprise silica particles.

5. The friction material of claim 4, wherein the silica particles have an irregular shape.

6. The friction material of claim 1, wherein the nanoparticle-sized friction modifying particles comprise diatomaceous earth.

7. The friction material of claim 1, wherein the nanoparticle-sized friction modifying particles comprise a mixture of carbon particles and silica particles.

8. The friction material of claim 1, wherein the nanoparticle-sized friction modifying particles comprise metal oxides.

9. The friction material of claim 1, wherein the nanoparticle-sized friction modifying particles comprise nitrides.

10. The friction material of claim 1, wherein the nanoparticle-sized friction modifying particles comprise carbides.

11. The friction material of claim 1, wherein the base material is a nonwoven fibrous material.

12. The friction material of claim 1, wherein the base material is a woven fibrous material.

13. The friction material of claim 1, wherein the base material comprises from about 15 to about 25% cotton, about 40 to about 50% aramid fibers, about 10 to about 20% carbon fibers, about 5 to about 15% carbon particles, and about 5 to about 15% filler material.

14. The friction material of claim 13, wherein the top layer of the friction material comprises nanoparticle-sized silica friction modifying particles deposited on fibers and/or filler material in the base material.

15. The friction material of claim 1, wherein the base material comprises 10 to 50%, by weight, of a less fibrillated aramid fiber; 10 to 35%, by weight, of activated carbon particles; 5 to 20%, by weight, cotton fibers, 2 to 15%, by weight, carbon fibers; and 10 to 35%, by weight, of a filler material.

16. The friction material of claim 1, wherein the resin comprises at least one of the following: at least one phenolic resin, at least one modified phenolic resin, at least one silicon resin, at least one silicone modified resin, at least one epoxy resin, at least one epoxy modified resin, and mixture of the above.

17. The friction material of claim 16, wherein the resin comprises a mixture of at least one phenolic resin and at least one silicone resin wherein the amount of silicone resin in the resin mixture ranges from approximately 5 to approximately 80%, by weight, based on the weight of the resin mixture.

18. The friction material of claim 16, wherein the phenolic resin is present in a solvent material and the silicone resin is present in a solvent material which is compatible with the solvent material of the phenolic resin.

19. The friction material of claim 16, wherein the amount of silicone resin present in the silicone-phenolic resin mixture ranges from 20 to 25%, by weight, based on the weight of the mixture.

20. The friction material of claim 16, wherein the amount of silicone resin present in the silicone phenolic resin mixture ranges from 15 to 25%, by weight, based on the weight of the mixture.

21. The friction material of claim 16, wherein the modified phenolic resin comprises at least one epoxy phenolic resin.

22. The friction material of claim 16, wherein the amount of epoxy resin present in the epoxy phenolic resin ranges from 5 to 25%, by weight, based on the weight of the epoxy phenolic resin.

23. The friction material of claim 16, wherein the amount of epoxy resin present in the epoxy phenolic resin ranges from 10 to 15%, by weight, based on the weight of the epoxy phenolic resin.

24. The friction material of claim 1, wherein the friction material withstands pressures up to at least 1500 psi and surface speeds up to at least about 65 meters per second.

25. The friction material of claim 1, wherein the base material comprises a fibrous base material.

26. An oil lubricated friction material for use in a clutch or brake comprising a fibrous first layer comprising a base material and at least one resin material, and a second layer comprising nanoparticle-sized friction modifying particles on a top surface of the base material wherein the base material has an average pore diameter of 5 to 7 μm, wherein the second layer of the nanoparticle-sized friction modifying particles having a thickness of 10 nm to 250 μm, wherein the nanoparticle-sized friction modifying particles have an average diameter size from 10 nm to 150 nm, and wherein the nanoparticle layer covers 3 to 99%, by area, of the base material.

27. An oil lubricated friction material for use in a clutch or brake comprising a first layer comprising a fibrous base material and at least one resin material, and a second layer comprising nanoparticle-sized friction modifying particles on a top surface of the base material, the friction material having good coefficient of friction characteristics, anti-shudder characteristics, dissipation of heat characteristics, and heat resistance, thereby improving the friction and durability characteristics of the friction material, wherein the second layer of the nanoparticle-sized friction modifying particles has a thickness of about 10 nm to about 250 μm, wherein the nanoparticle-sized friction modifying particles have an average diameter size from about 10 nm to about 150 nm, and wherein the nanoparticle layer covers 3 to 99%, by area, of the base material.

28. The friction material of claim 27, wherein the friction material withstands pressures up to about 1500 psi and surface speeds of up to about 65 meters per second.

29. An oil lubricated friction material for use in a clutch or brake comprising a first layer comprising a fibrous base material and at least one resin material, and a second layer comprising nanoparticle-sized friction modifying particles on a top surface of the base material wherein the base material has an average pore diameter of 5 to 7 μm, the friction material having good coefficient of friction characteristics, anti-shudder characteristics, dissipation of heat characteristics, and heat resistance, thereby improving the friction and durability characteristics of the friction material, wherein the second layer of the nanoparticle-sized friction modifying particles has a thickness of 10 nm to 250 μm, wherein the nanoparticle-sized friction modifying particles have an average diameter size from 10 nm to 150 nm, and wherein the nanoparticle layer covers 3 to 99%, by area, of the base material.

* * * * *